(12) United States Patent
Kamiya

(10) Patent No.: US 11,210,040 B2
(45) Date of Patent: Dec. 28, 2021

(54) SETUP SUPPORT SYSTEM, INFORMATION PROCESSING APPARATUS, IMAGE FORMING APPARATUS, AND METHOD FOR CONTROLLING SETUP SUPPORT SYSTEM

(71) Applicant: CANON KABUSHIKI KAISHA, Tokyo (JP)

(72) Inventor: Yuka Kamiya, Machida (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/701,566

(22) Filed: Dec. 3, 2019

(65) Prior Publication Data

US 2020/0201581 A1 Jun. 25, 2020

(30) Foreign Application Priority Data

Dec. 19, 2018 (JP) .............................. JP2018-237797

(51) Int. Cl.
*G06F 3/12* (2006.01)
*G06F 21/10* (2013.01)
*G06F 8/61* (2018.01)

(52) U.S. Cl.
CPC .............. *G06F 3/123* (2013.01); *G06F 3/121* (2013.01); *G06F 3/1204* (2013.01); *G06F 3/1231* (2013.01); *G06F 8/61* (2013.01); *G06F 21/105* (2013.01); *G06F 2221/0704* (2013.01)

(58) Field of Classification Search
CPC ........ G06F 3/123; G06F 3/1204; G06F 3/121; G06F 3/1231; G06F 8/61; G06F 21/105; G06F 2221/0704

USPC ....................................... 358/1.15, 1.9, 1.16
See application file for complete search history.

(56) References Cited

U.S. PATENT DOCUMENTS

| 2010/0149587 | A1* | 6/2010 | Yoshida | ............. H04N 1/00222 |
| | | | | 358/1.15 |
| 2013/0054774 | A1* | 2/2013 | Kikuchi | ................... H04N 1/32 |
| | | | | 709/223 |
| 2015/0067671 | A1 | 3/2015 | Kamiya | |

FOREIGN PATENT DOCUMENTS

JP 2015205499 A 11/2015

* cited by examiner

*Primary Examiner* — Quang N Vo
(74) *Attorney, Agent, or Firm* — Carter, DeLuca & Farrell LLP

(57) ABSTRACT

A setup support system having a plurality of image forming apparatuses, an information processing apparatus that generates an instruction sheet, and a license management server that manages a license of software; the image forming apparatus comprising: at least one processor and memory storing a program that makes the processor function as: an analysis unit configured to analyze an instruction sheet and identify the instruction sheet type; an acquiring unit configured to acquire software information of software installed in the image forming apparatus from the license management server if the analysis unit identifies that the instruction sheet type is a second type; a determination unit configured to determine a setup process and the order of execution of the setup process based on the software information and the instruction sheet; and an execution unit configured to execute the setup process in accordance with the determination of the determination unit.

9 Claims, 16 Drawing Sheets

FIG. 11

```
<?xml version="1.0" encoding="utf-8" ?>
<Script xmlns:xsl="http://www.XXX.com/XMLSchema">

<scriptSummary>                                              ⎫
        <deviceid></deviceid>                                    ⎪
        <create>20180703153046</create>                          ⎬ 1101
        <scriptid>0123456789</scriptid>                          ⎪
        <sciptName>individual script</scriptName>                ⎪
    </scriptSummary>                                             ⎭

<commands>

<updateFirmwareCommand order="1">                        ⎫
            <relativeDirPath>FirmwarePath</relativeDirPath>      ⎬ 1102
            <firmwareName>Firmware_v100.zip</firmwareName >      ⎪
        </updateFirmwareCommand>                                 ⎭

<installSoftwareCommand order="2">                       ⎫
            <productid>PID_01</productid>                        ⎪
            <liceseAccessNumber>LAN01</liceseAccessNumber>       ⎬ 1103
            <softwareid>SW_01</softwareid>                       ⎪
        </installSoftwareCommand >                               ⎭

<satrSoftware order="3">                                 ⎫
            <softwareid>SW_01</softwareid>                       ⎬ 1104
        </satrSoftware>                                          ⎭

<importConfigCommand order="4">                          ⎫
            <ConfigFileName>ConfigurationFile.zip</ConfigFileName> ⎬ 1105
        </importConfigCommand >                                  ⎭

</commands>

</Script>
```

```
<?xml version="1.0" encoding="utf-8" ?>
<Script xmlns:xsl="http://www.XXX.com/XMLSchema">

<scriptSummary>
        <deviceid></deviceid>
        <create>20180703153046</create>
        <scriptid>0123456789</scriptid>
        <sciptName>individual script</scriptName>
        <!-- LiceseManagementServer or Script -->
        <swSpecifyingMethod>LiceseManagementServer</ swSpecifyingMethod >

</scriptSummary>
    <commands>

<updateFirmwareCommand order="1">
            <relativeDirPath>FirmwarePath</relativeDirPath>
            <firmwareName>Firmware_v100.zip</firmwareName >
        </updateFirmwareCommand>

<importConfigCommand order="4">
            <ConfigFileName>ConfigurationFile.zip</ConfigFileName>
        </importConfigCommand >

</commands>
</Script>
```

```xml
<?xml version="1.0" encoding="utf-8" ?>
<Script xmlns:xsl="http://www.XXX.com/XMLSchema">
    <scriptSummary>
        <deviceid></deviceid>
        <create>20180703153046</create>
        <scriptid>0123456789</scriptid>
        <sciptName>individual script</scriptName>
        <!-- LicenseManagementServer or Script -->
        <swSpecifyingMethod>LiceseManagementServer</ swSpecifyingMethod >

<!-- all or Choice -->
        <swSelectionMethod>Choice</ swSelectionMethod >

<!-- Latest or Choice -->
        <verSelectionMethod>Choice</ verSelectionMethod >
    </scriptSummary>
    <commands>
        <updateFirmwareCommand order="1">
            <relativeDirPath>FirmwarePath</relativeDirPath>
            <firmwareName>Firmware_v100.zip</firmwareName >
        </updateFirmwareCommand>
        <importConfigCommand order="4">
            <ConfigFileName>ConfigurationFile.zip</ConfigFileName>
        </ importConfigCommand >
    </commands>
</Script>
```

1600, 1601, 1202, 1602, 1603, 1102, 1105

SETUP SUPPORT SYSTEM, INFORMATION PROCESSING APPARATUS, IMAGE FORMING APPARATUS, AND METHOD FOR CONTROLLING SETUP SUPPORT SYSTEM

BACKGROUND OF THE INVENTION

Field of the Invention

The present invention relates to a setup support system, an information processing apparatus, an image forming apparatus, and a control method for the setup support system.

Description of the Related Art

A system has been proposed in which an instruction sheet is downloaded from an instruction sheet management server and the setup for an image forming apparatus is performed. Japanese Unexamined Patent Application, First Publication No. 2015-205499 discloses an image forming apparatus in which a scripting for setting the setting information to be reflected on the image forming apparatus in the information processing apparatus is acquired via a network, and the setting information is acquired via the network accompanying the execution of the scripting. In downloading the instruction sheet, a user specifies an instruction sheet by inputting a device serial number of the image forming apparatus or inputting an identifier (hereinafter, referred to as an "instruction sheet ID") instead of the device serial number to serve as the identifier. In searching the instruction sheet by using the device serial number, it is necessary to associate the device serial number with the instruction sheet in advance at the stage of creating the instruction sheet. In a user's input to the instruction sheet ID, if the instruction sheets are different, in other words, the setup contents are different, the user needs to use each identifier properly. Taking a load on a setup operator into consideration, searching the instruction sheet by the image forming apparatus by using the device serial number of by the image forming apparatus is better than searching the instruction sheet by inputting the instruction ID.

However, in many cases, it is difficult to acquire the device serial number until immediately before setup, so it is difficult for an instruction sheet creator to record the device serial number in advance in the instruction sheet. Hence, in many cases, a setup operator has to search the instruction sheet by using the instruction ID. For example, there are 50 image forming apparatuses to be set up in a configuration A and one image forming apparatus to be set up in a configuration B. Even if the difference between the configuration A and the configuration B is only the software to be installed, the instruction sheet creator must create a plurality of instruction sheets that correspond to each of the configuration A and the configuration B. Subsequently, the setup operator has to search the instruction sheet by specifying the instruction IDs for each instruction sheet. In such a case in which various types of the image forming apparatuses having slightly different configurations need to be constructed, the load on both the instruction sheet creator and the setup operator tend to be large. Hence, it is desired to enable setting up the image forming apparatuses having a plurality of different configurations by using only one instruction sheet. Additionally, the fact that only one instruction sheet is required allows the setup user to set up the image forming apparatuses having different configurations by using only one instruction sheet ID.

SUMMARY OF THE INVENTION

The present invention provides a setup support system that can improve the operation efficiency for setting up a plurality of image forming apparatuses.

A setup support system according to the present invention has a plurality of image forming apparatuses, an information processing apparatus that generates an instruction sheet structured by an instruction for setting up the image forming apparatus, and a license management server that manages a license of software. The information processing apparatus comprises: at least one processor and memory storing a program that makes the processor function as: an instruction sheet generation unit configured to generate an instruction sheet including a description of an instruction sheet type indicating a method for determining software to be installed; wherein the instruction sheet type is a first type that indicates that software to be installed in the image forming apparatus is determined in accordance with the contents of the instruction sheet, or a second type that indicates that the software to be installed in the image forming apparatus is determined in accordance with information registered in the license management server; the image forming apparatus comprising: at least one processor and memory storing a program that makes the processor function as: an analysis unit configured to analyze the instruction sheet and identify the instruction sheet type; an acquiring unit configured to acquire software information for software that can be installed in the image forming apparatus from the license management server if the analysis unit identifies that the instruction sheet type is the second type; a determination unit configured to determine a setup process and the order of execution of the setup process based on the software information and the instruction sheet; and an execution unit configured to execute the setup process in accordance with the determination of the determination unit.

Further features of the present invention will become apparent from the following description of exemplary embodiments with reference to the attached drawings.

BRIEF DESCRIPTION OF THE DRAWINGS

FIG. 11 illustrates an example of a conventional instruction sheet.

FIG. 12 illustrates an example of an instruction sheet according to the first embodiment.

FIG. 16 illustrates a part of an example of an instruction sheet according to the second embodiment.

DESCRIPTION OF THE EMBODIMENTS

First Embodiment

Figure 1:
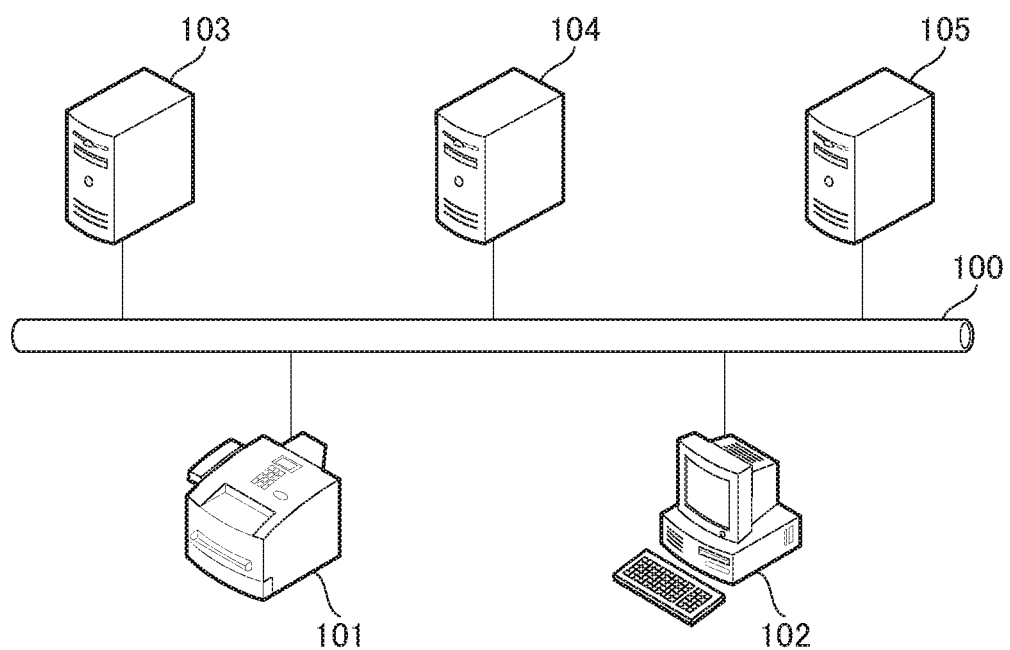
FIG. 1 illustrates an example of a device configuration in a setup support system.

FIG. 1 illustrates an example of a device configuration in a setup support system of an image forming apparatus. The setup support system according to the present embodiment includes an image forming apparatus 101, an instruction sheet creation apparatus 102, an instruction sheet management server 103, a license management server 104, and a software management server 105. The image forming apparatus 101, the instruction sheet creation apparatus 102, the instruction sheet management server 103, the license management server 104, and the software management server 105 are connected to a LAN (Local Area Network) 100.

The image forming apparatus 101 is a multi-function peripheral in which a plurality of functions such as a scanner, a printer, a facsimile, and a file transmission function are integrated with a copying machine. In installing and setting up the image forming apparatus 101, the image forming apparatus 101 downloads an instruction sheet from the instruction sheet management server 103 and executes setup processing based on the instruction sheet. Additionally, during the setup, the image forming apparatus 101 also communicates with the license management server 104 and the software management server 105, and downloads software necessary for setup.

The instruction sheet creation apparatus 102 is a client computer in an image forming apparatus installation system. The instruction sheet creation apparatus 102 is an information processing apparatus, for example, a personal computer. The instruction sheet creation apparatus 102 generates an instruction sheet for setting up the image forming apparatus 101, and uploads the generated instruction sheet to the instruction sheet management server 103. The setup contents of the image forming apparatus 101 are defined in the instruction sheet. The instruction sheet is described, for example, in a scripting.

The instruction sheet management server 103 is a server that manages the instruction sheet generated by the instruction sheet creation apparatus 102. In response to a request from the image forming apparatus 101 and the instruction sheet creation apparatus 102, the instruction sheet management server 103 transmits a specific instruction sheet, and receives a result for the process upon executing the instruction sheet in the image forming apparatus 101.

The license management server 104 issues a license for installing software managed by the software management server 105 on the image forming apparatus 101, and manages a license issuance history.

The software management server 105 is a server that manages software that is installable on the image forming apparatus 101, various optional applications, and the like. The software management server 105 transmits specific software and the like in response to a request from the image forming apparatus 101. Note that the instruction sheet management server 103, the license management server 104, and the software management server 105 may be directly connected to the LAN 100 or may be connected via the Internet.

Figure 2:
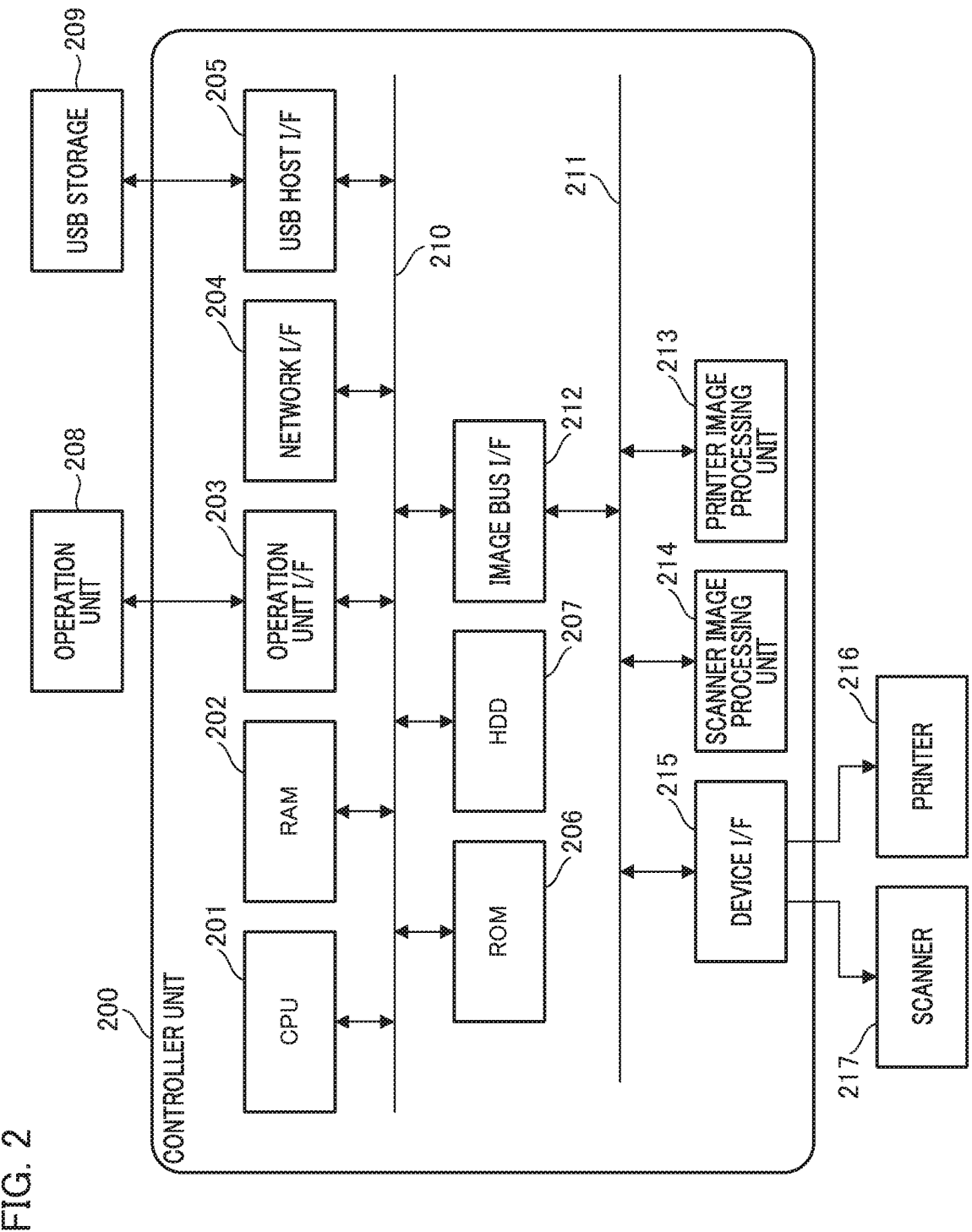
FIG. 2 is a block diagram illustrating an example of a configuration of the main part of an image forming apparatus.

FIG. 2 is a block diagram illustrating an example of a configuration of the main part of the image forming apparatus 101. The image forming apparatus 101 includes a controller unit 200, to which a scanner 217 serving as an image input device and a printer 216 serving as an image output device are connected, and to which an operation unit 208 is connected. The controller unit 200 performs control to realize a copying function in which image data that has been read by the scanner 217 is printed-out from the printer 216.

The controller unit 200 has a CPU 201, a RAM 202, a ROM 206, an HDD 207, an operation unit I/F 203, a network I/F 204, a USB host I/F 205, and an image bus I/F 212. These are connected via a system bus 210. Additionally, the controller unit 200 has a device I/F 215, a scanner image processing unit 214, and a printer image processing unit 213. The image bus I/F 212, the device I/F 215, the scanner image processing unit 214, and the printer image processing unit 213 are connected via an image bus 211.

The CPU (Central Processing Unit) 201 executes a boot program stored in the ROM (Read only memory) 206 to load and start an operation system (OS). The CPU 201 executes programs stored on the HDD (hard disc drive) 207 in the OS to realize various types of processing. The RAM (Random access memory) 202 is used to serve as a work area of the CPU 201. The RAM 202 provides a work area to the CPU 201, and provides an image memory area for temporarily storing image data. The HDD 207 stores the programs and the image data.

The operation unit I/F (operation unit interface) 203 is an interface with the operation unit 208. The operation unit I/F 203 outputs the image data to be displayed on the operation unit 208 to the operation unit 208. Additionally, the operation unit I/F 203 transmits information that has been input by the user through the operation unit 208 to the CPU 201. The operation unit 208 has a touch panel, displays, for example, the setting information and the image data, and receives an operation from the user.

The network I/F (network interface) 204 is an interface for connecting the image forming apparatus 101 to the LAN.

The USB host I/F (USB Host Interface) 205 is an interface that communicates with a USB storage 209. The USB host I/F 205 outputs the data stored in the HDD 207 to the USB storage 209. Additionally, the USB host I/F 205 inputs the data stored in the USB storage 209 and transmits the data to the CPU 201. The USB storage 209 is an external storage device that stores data and is attachable to and detachable from the USB host I/F 205. A plurality of USB devices including the USB storage 209 can be connected to the USB host I/F 205.

The image bus I/F 212 is a bus bridge for connecting the system bus 210 and the image bus 211 that transfers the image data at a high speed to convert the data format. The image bus 211 is configured by, for example, a PCI bus or the IEEE 1394. A device I/F 215, the scanner image processing unit 214, and the printer image processing unit 213 are provided on the image bus 211.

The scanner 217 and the printer 216 are connected to the device I/F 215. The device I/F 215 performs synchronous/asynchronous conversion of the image data. The scanner image processing unit 214 corrects, processes, and edits the input image data. The printer image processing unit 213 performs, for example, correction and resolution conversion in accordance with the printer 216 to the print output image data.

Figure 3:
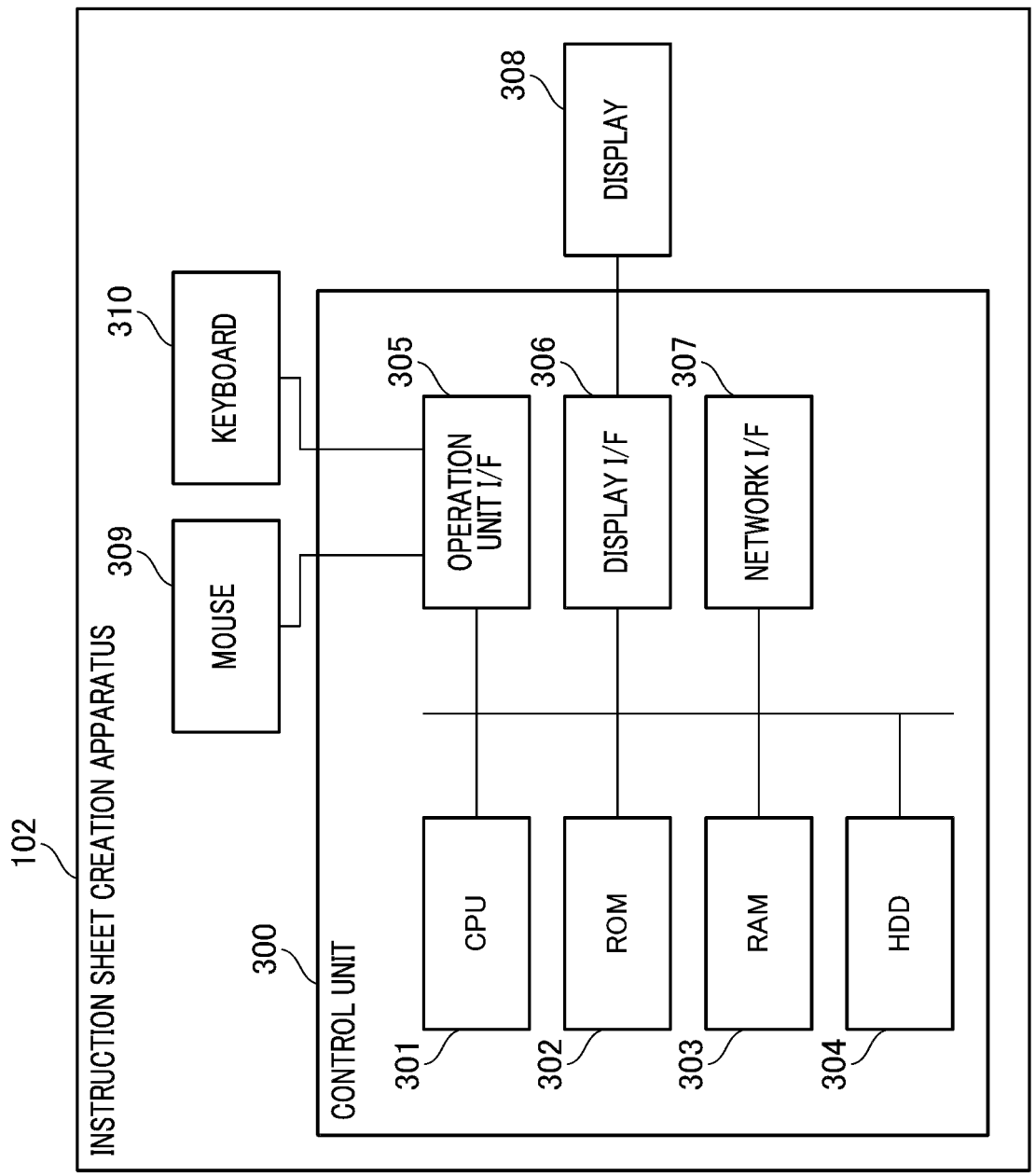
FIG. 3 is a block diagram illustrating an example of a configuration of an instruction sheet creation apparatus.

FIG. 3 is a block diagram illustrating a configuration of the instruction sheet creation apparatus 102. A control unit 300 including a CPU 301 controls the overall operation of the instruction sheet creation apparatus 102. The CPU 301 reads the control program stored in a ROM 302 and executes various types of control processing. A RAM 303 is used as a temporary storage area such as a main memory and a work area of the CPU 301. An HDD 304 stores the image data and the various programs.

An operation unit I/F 305 is an interface that connects a user interface terminal that inputs a control operation to a program executed by the instruction sheet creation apparatus 102. In the present embodiment, although the user interface terminal is configured by a mouse 309 and a keyboard 310, the present invention is not limited thereto, and any device may be used if it is a device for inputting information.

A display I/F 306 is an interface that connects a display terminal that displays a UI (User Interface) of a program executed by the instruction sheet creation apparatus 102. In the present embodiment, although the display terminal is configured by a display 308, the present invention is not limited thereto, and any device that provides the information to the user may be used.

A network I/F 307 connects the control unit 300 to the LAN 100. The network I/F 307 transmits and receives various types of information to and from the other devices via the network.

Figure 4:
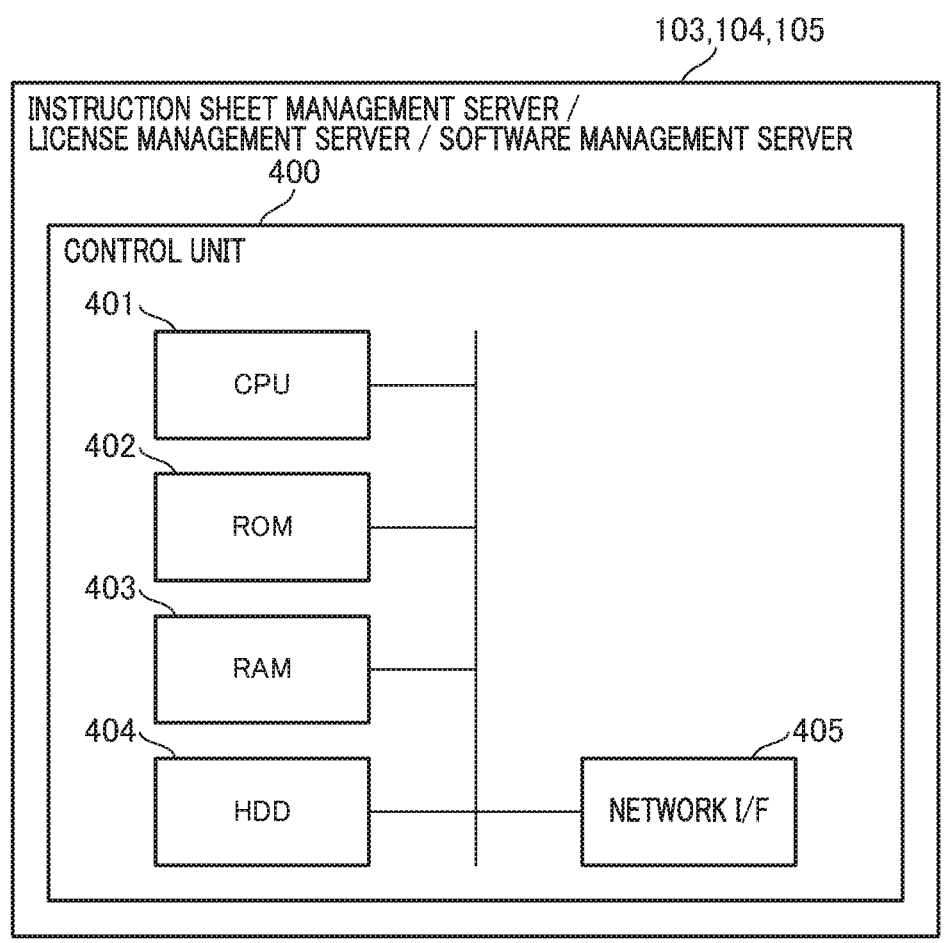
FIG. 4 is a block diagram illustrating an example of a configuration of various management servers.

FIG. 4 is a block diagram illustrating configurations of the instruction sheet management server 103, the license management server 104, and the software management server 105. A control unit 400 including a CPU 401 controls the overall operation of the instruction sheet management server 103, the license management server 104, or the software management server 105. The CPU 401 reads the control program stored in a ROM 402 and executes various types of control processing. A RAM 403 is used as a temporary storage area such as the main memory and the work area of the CPU 401.

In the instruction sheet management server 103, an HDD 404 stores the instruction sheet transmitted from the instruction sheet creation apparatus 102 and the result for executing the instruction sheet by the image forming apparatus 101. The HDD 404 stores, for example, product information, software information, and license information in the license management server 104. The HDD 404 stores various types of software in the software management server 105. A network I/F 405 connects the control unit 400 to the LAN 100. The network I/F 405 transmits and receives various types of information to and from the other devices via the network.

Figure 5:
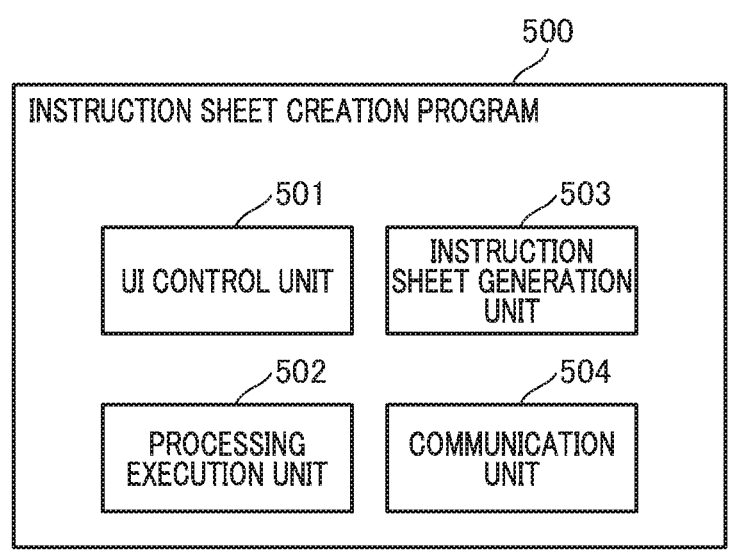
FIG. 5 illustrates an example of a functional configuration of an instruction sheet creation program.

FIG. 5 illustrates an example of a functional configuration of an instruction sheet creation program 500 that operates on the instruction sheet creation apparatus 102. Each function is realized by the CPU 301 executing a program. Note that in the present embodiment, although it is assumed that the program is executed by the instruction sheet creation apparatus 102, the present invention is not limited thereto. The program may be executed by a server or a service on the network via the network I/F 307.

The instruction sheet creation program 500 has a UI control unit 501, a processing execution unit 502, an instruction sheet generation unit 503, and a communication unit 504. The UI control unit 501 provides a UI for operating the instruction sheet creation program to the operator via a display 308, and receives an operator's operation via the mouse 309 or the keyboard 310.

The processing execution unit 502 controls each processing unit in accordance with an instruction from the UI control unit 501, and executes various types of processing. In response to an instruction from the processing execution unit 502, the instruction sheet generation unit 503 generates an instruction sheet in a format that can be interpreted by the image forming apparatus 101. In accordance with the instruction from the processing execution unit 502, the communication unit 504 transmits the instruction sheet that has been generated by the instruction sheet generation unit 503 to the instruction sheet management server 103, or acquires the instruction sheet held by the instruction management server 103.

Figure 6:
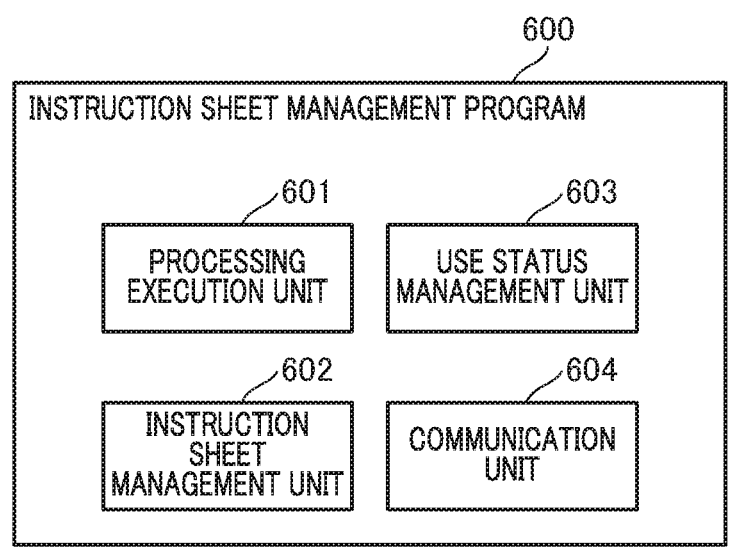
FIG. 6 illustrates an example of a functional configuration of an instruction sheet management program.

FIG. 6 illustrates an example of a functional configuration of an instruction sheet management program 600 that operates on the instruction sheet management server 103. Each function is realized by the CPU 401 of the instruction sheet management server 103 executing a program. The instruction sheet management program 600 has a processing execution unit 601, an instruction sheet management unit 602, a use status management unit 603, and a communication unit 604.

The processing execution unit 601 controls each processing unit and executes the processing in response to receipt of a request transmitted from the image forming apparatus 101 or the instruction sheet creation apparatus 102 by the communication unit 604. The instruction sheet management unit 602 accumulates and manages instruction sheets generated by the instruction sheet management server 103. The use status management unit 603 accumulates and manages the state and the result when the image forming apparatus 101 has executed the instruction sheet. The communication unit 604 receives the request or the execution result from the image forming apparatus 101 and the instruction sheet creation apparatus 102, and transmits the instruction sheet and other necessary information depending on the request.

Figure 7:
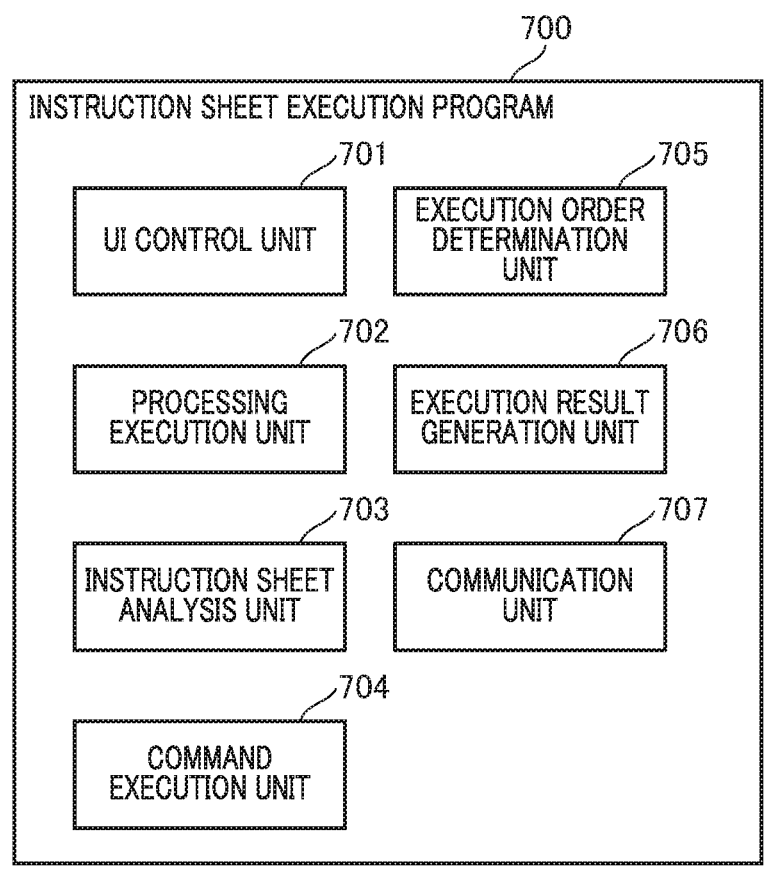
FIG. 7 illustrates an example of a functional configuration of an instruction execution program.

FIG. 7 illustrates an example of a functional configuration of an instruction sheet execution program 700 that operates on the image forming apparatus 101. In the present embodiment, although the instruction sheet execution program 700 is installed as a program of the image forming apparatus 101, the present invention is not limited to the installation format. Each function is realized by executing a program by the CPU 201 of the image forming apparatus 101. The instruction sheet execution program 700 has a UI control unit 701, a processing execution unit 702, an instruction sheet analysis unit 703, a command execution unit 704, an execution order determination unit 705, an execution result generation unit 706, and a communication unit 707.

The UI control unit 701 provides a UI for operating the instruction sheet execution program 700 to the user through the operation unit 208 and receives the user's operation. The processing execution unit 702 performs various types of processing in accordance with the instruction from the UI control unit 701. The instruction sheet analysis unit 703 analyzes an instruction sheet received from the instruction sheet management server 103 and converts it into a command, and generates information necessary for generating an execution result.

The command execution unit 704 requests each service of the image forming apparatus 101 to perform a process and executes a function based on the contents that have been analyzed by the instruction sheet analysis unit 703. Furthermore, the command execution unit 704 provides a notification about the execution result of the requested process to the execution result generation unit 706. The execution order determination unit 705 determines the execution order of each command based on the contents analyzed by the instruction sheet analysis unit 703.

The execution result generation unit 706 generates an execution result for each command and an execution result for the overall instruction sheet in accordance with the execution result of each service and the function for which notification is provided from the command execution unit 704. The communication unit 707 receives the instruction sheet transmitted from the instruction sheet management server 103 and transmits the execution result to the instruction sheet management server 103. Additionally, the communication unit 707 receives software license information from the license management server 104 and receives software from the software management server 105.

Figure 8:
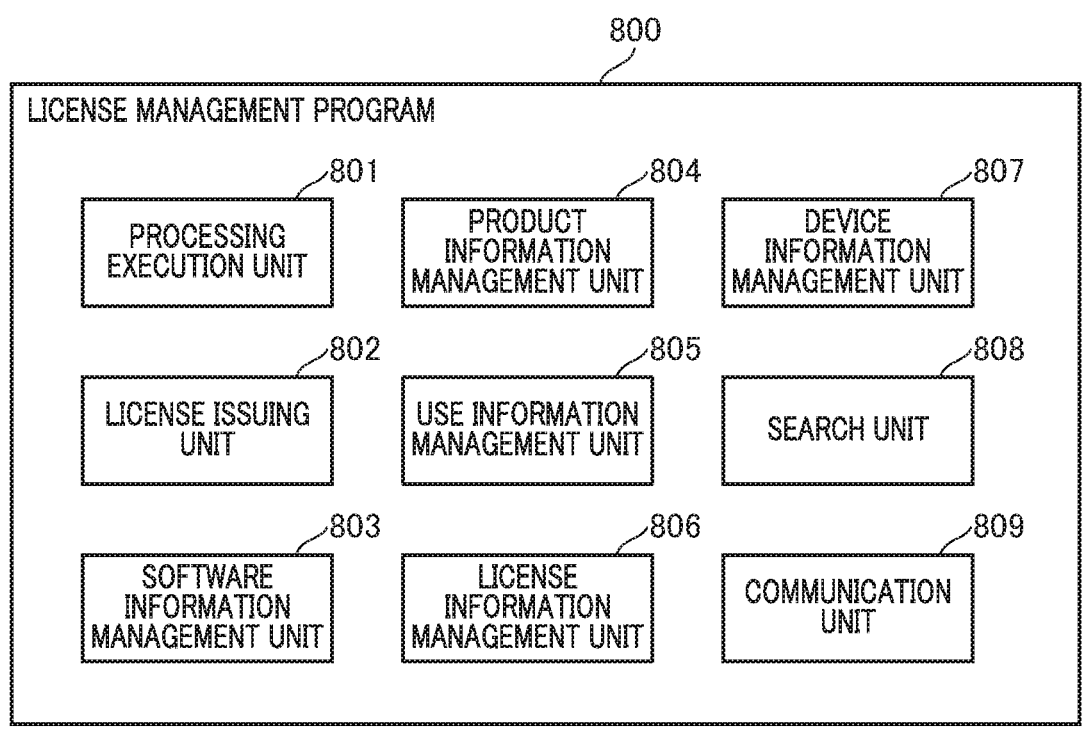
FIG. 8 illustrates an example of a functional configuration of a license management program.

FIG. 8 illustrates an example of a functional configuration of a license management program 800 that operates on the license management server 104. Each function is realized by the CPU 401 of the license management server 104 executing the program. The license management program 800 has a processing execution unit 801, a license issuing unit 802, a software information management unit 803, a product information management unit 804, a use information management unit 805, a license information management unit 806, a device information management unit 807, a search unit 808, and a communication unit 809.

The processing execution unit 801 controls each processing unit and executes processing in response to various requests received by the communication unit 809. The license issuing unit 802 registers the license access number and the device serial number that can uniquely identify the image forming apparatus in a use information table managed by the use information managing unit 805, and issues a license.

The software information management unit 803 holds and manages a software information table on the HDD disk 404 of the license management server 104. Table 1 shows an example of the software information table.

TABLE 1

| Software ID | Software Name | Software file path |
|---|---|---|
| SWID_01 | SW_01 | ¥¥Server¥SW_01.jar |
| SWID_02 | SW_02 | ¥¥Server¥SW_02.jar |
| SWID_03 | SW_03 | ¥¥Server¥SW_03.jar |

In the software information table, a software ID, a software name, and a software file path (hereinafter, also referred to as a "software path") are managed as the software information. The software ID is an identifier that uniquely identifies the software file. The software name is the name of the software. The software file path is a path indicating the location of the software management server 105 that manages the software file on the HDD 404. These pieces of the software information are added upon receipt of the software information registering request by the communication unit 809.

The product information management unit 804 holds and manages the product information table in the HDD 404 of the license management server 104. A product is a unit for selling an application file and a customer purchases the application file in product units. Table 2 shows an example of the product information table.

TABLE 2

| Product ID | Product Name | Software ID | License Access Number |
|---|---|---|---|
| PID_01 | P_01 | SWID_01 | LAN01 |
| PID_02 | P_02 | SWID_02 | LAN02 |
|  |  | SWID_03 |  |
| PID_03 | P_03 | SWID_03 | LAN03 |

In the product information table, the product ID, the product name, the software ID, and the license access number are managed as the product information. The product ID is an identifier that uniquely identifies the product. The product name is the name of the product. The software ID is a software ID of a software file that becomes available by purchasing the product. If a plurality of software files is available for one product, a plurality of software IDs can be set. Additionally, a plurality of versions of the same software may be included in one product. The license access number is a number required for the customer to use the product. The license access number is used as a number that identifies the product in registering the use information to be described below. These pieces of the product information are added upon receipt of the product information registration request by the communication unit 809.

The use information management unit 805 holds and manages the use information table in the HDD disk 404 of the license management server 104. The use information is information about a contract concluded between a customer and a sales company, and the use information management unit 805 holds information about which product is to be used in the image forming apparatus that has been purchased by the customer. Table 3 shows an example of the use information table.

TABLE 3

| License Access Number | Device Serial Number |
|---|---|
| LAN01 | DSN01 |
| LAN02 | DSN02 |
| LAN03 | DSN03 |

In the use information table, the license access number and the device serial number are managed as the use information. The license access number is a license access number of a product contracted with the customer. The device serial number is a number that can uniquely identify an image forming apparatus contracted with the customer. These pieces of the use information are added upon receipt of the use information registration request by the communication unit 809.

The license information management unit 806 holds and manages the license information table that holds the license information that has been issued by the license issuing unit 802 in the HDD 404 of the license management server 104. Table 4 shows an example of the license information table.

TABLE 4

| Software ID | Device Serial Number | License Path |
|---|---|---|
| SWID_01 | DSN01 | LIC_A.lic |
| SWID_02 | DSN02 | LIC_B.lic |
| SWID_03 | DSN02 | LIC_C.lic |
|  | DSN03 | LIC_D.lic |

In the license information table, the software ID, the device serial number, and the license path are managed to serve as the license information. The software ID is a software ID of a software file that can be used with the issued license. The device serial number is a device serial number of the image forming apparatus in which the software file can be used with the issued license. The license path is a path that indicates the location of the license stored in the HDD 404. The use information of these pieces of the license information is registered by the license issuing unit 802 and added in units in which a license is issued.

The search unit 808 searches for desired information from various tables shown in Table 1 to Table 4 in response to a request from the communication unit 809. For example, in the present embodiment, a product contracted with the customer is searched for based on the device serial number, and then an available software file included in the product and the software file path of the software file are searched.

The communication unit 809 transmits and receives the information to and from an external device. Specifically, the communication unit 809 receives a request for additionally registering the information in various tables shown in Table 1 to Table 3, receives a search request from the image forming apparatus 101, and provides a notification about the software file path that has been searched for by the search unit 808 to the image forming apparatus 101.

The device information management unit 807 generates, holds, and manages a device information table in units of the device serial number. After the license information management unit 806 adds the license information, the device information management unit 807 generates the device information table based on the product information table shown in Table 2 and the use information table shown in Table 3. Table 5 shows an example of the device information table.

TABLE 5

| Device Serial No. | Product ID | Software ID |
| --- | --- | --- |
| DSN01 | PID_01 | SWID_01 |
| DSN02 | PID_02 | SWID_02 |
|  |  | SWID_03 |
| DSN03 | PID_03 | SWID_03 |

The device information table manages the device serial number, the product ID, and the software ID to serve as the device information. By generating a table in units of the device serial number, the instruction sheet execution program 700 of the image forming apparatus 101 can specify software to be installed by using the device serial number of its own apparatus. Therefore, the instruction sheet execution program 700 of the image forming apparatus 101 can specify the software to be installed without recording the information about the software in the instruction sheet.

Conventionally, an administrator has registered the software information shown in Table 1 and the product information shown in Table 2. Note that the administrator has the same authority as the instruction sheet creator in the present embodiment. In contrast, the setup operator additionally has registered the license access number described in the license certificate of the software package purchased by the customer and the device serial number of the image forming apparatus to be set up in the use information table shown in Table 3. The additional registration in the use information table is realized by the setup operator operating on the client PC the GUI provided by the license management program.

Figure 9:
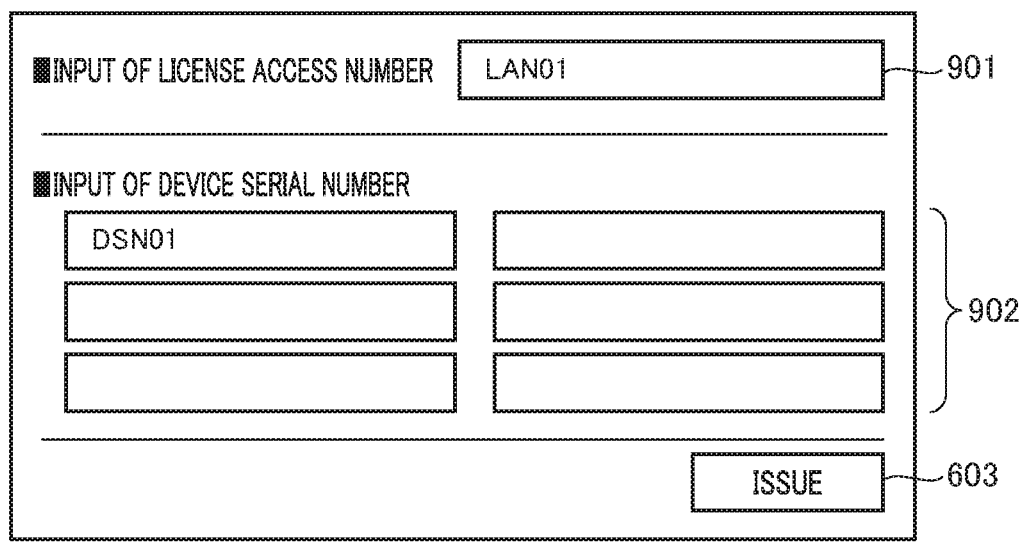
FIG. 9 illustrates an example of a GUI provided by the license management program.

FIG. 9 illustrates an example of the GUI provided by the license management program. The setup operator inputs the license access number to a license access number input area 901 and inputs the device serial number of the image forming apparatus that has been contracted with the customer to a device serial number input area 902. When an "Issue" button 903 is pressed, the use information management section 805 of the license management program 800 additionally registers the use information in the use information table shown in Table 3 in accordance with the input information.

That is, conventionally, the setup operator has performed the license issuance operation on behalf of the customer, and the instruction sheet creator (administrator) has not performed the operation that handles the device serial number and the license access number. In the present embodiment, the image forming apparatus 101 can be set up without changing the roles of the setup operator and the instruction sheet creator (administrator). Specifically, the proxy operation of a license issuing performed by the setup operator is left without any changes, and the instruction sheet creator (administrator) can create the instruction sheet without knowing the device serial number and the license access number. Further, conventionally, it has been necessary to create instruction sheets for each configuration to be set up. In contrast, in the present embodiment, a plurality of image forming apparatuses can be set up in different configurations by using one instruction sheet.

Figure 10A:
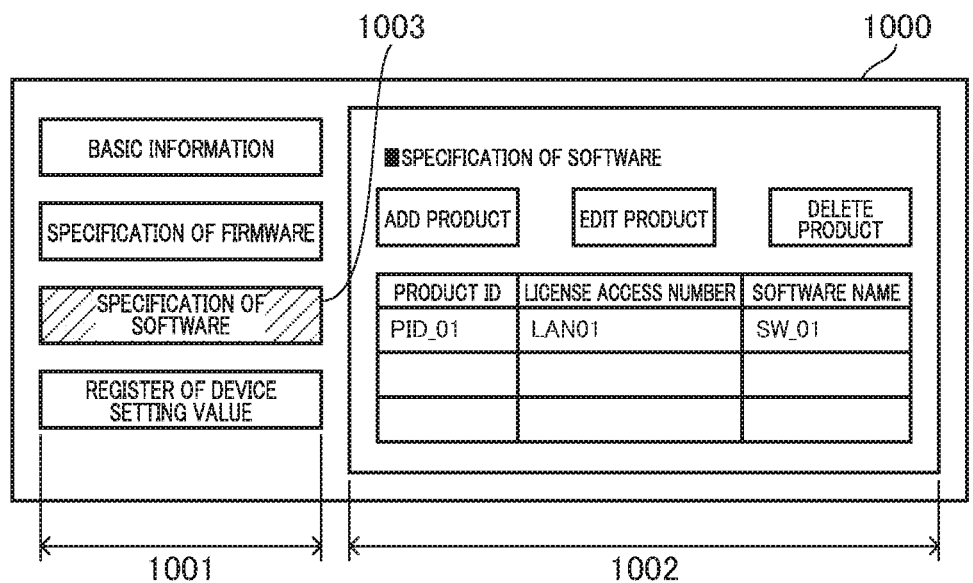
FIGS. 10A and 10B illustrate an example of an instruction sheet creation screen.

FIG. 10A illustrates an example of an instruction sheet creation screen in the prior art. An instruction sheet creation screen 1000 has two main configurations, page switching tabs 1001 and configuration contents setting regions 1002. On the page switching tabs 1001, specifying tabs corresponding to various pages such as a basic information page, a specified page of firmware, a specified page of software, and a device setting value registration page are displayed. The instruction sheet creator displays a desired page by pressing a specifying tab corresponding to a page to be displayed.

When a specification tab 1003 of the software is pressed by the instruction sheet creator, the instruction sheet creation program 500 displays a screen on which the information about software to be installed in the image forming apparatus 101 can be displayed and can be set in the configuration contents setting region 1002. Conventionally, it has been necessary to input the product ID and the license access number on a specification screen of the software by the instruction sheet creator. This is because, when the instruction sheet execution program 700 executes the instruction sheet, the product ID, the license access number, and the device serial number of the image forming apparatus 101 (the local apparatus) recorded in the instruction sheet are transmitted to the license management server 104 to specify the software to be installed. Subsequently, the software file and the license of the specified software are downloaded.

Figure 10B:
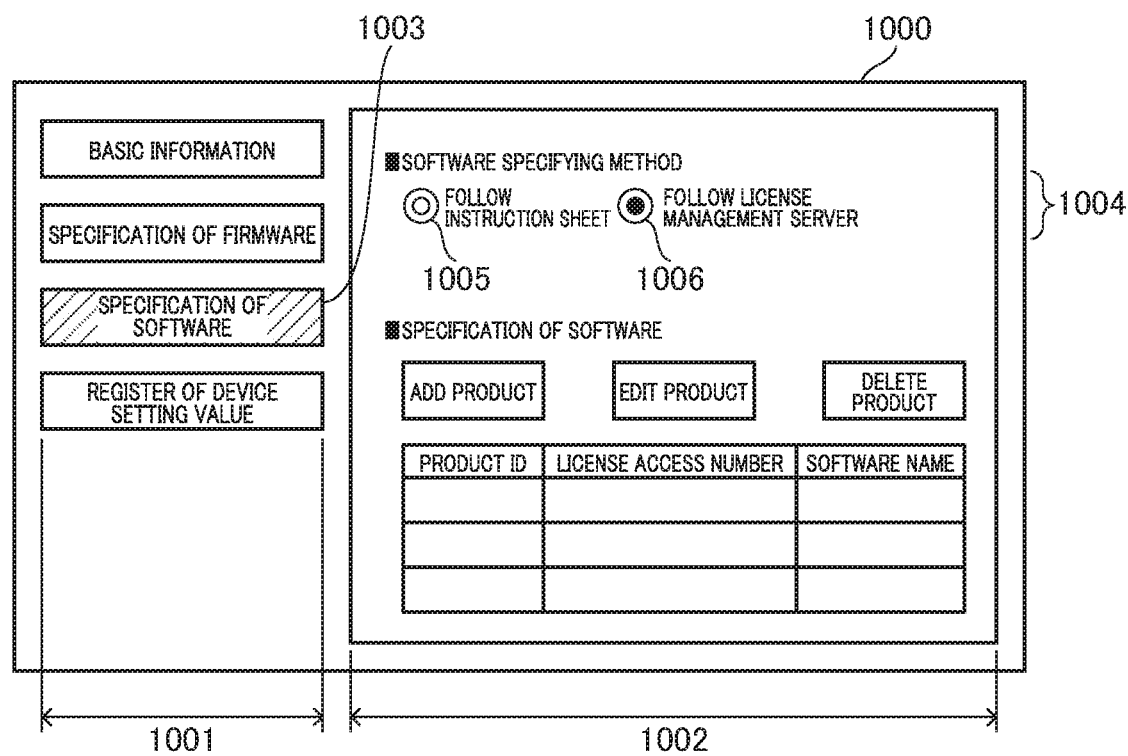

FIG. 10B illustrates an example of the instruction sheet creation screen in the present embodiment. When the specification tab 1003 of the software on an instruction sheet creation screen 1000 is pressed by the instruction sheet creator, a screen on which the information about the software to be installed in the image forming apparatus 101 can be displayed and can be set is displayed on the configuration contents setting region 1002.

In the specified page of the software in the present embodiment, a control 1004 that specifies a software specifying method is added to the conventional specified page of software. The control 1004 shows options of a radio button 1005 and radio button 1006. The radio button 1005 is a method for inputting a product ID and a license access number as in the conventional manner. The radio button 1006 is a method for specifying the software to be installed on the instruction execution program side in accordance with the registered contents of the license management server 104 without inputting the product ID or the license access number.

FIG. 11 illustrates an example of a conventional instruction sheet (hereinafter, also referred to as an "exclusive instruction sheet"). The instruction sheet is structured by instructions for setting up the image forming apparatus. Basic information 1101 and various commands 1102 to 1105 are described in an instruction sheet 1100. The basic information 1101 is a part that describes the basic information about the instruction sheet. The date and time of the instruction sheet and the instruction ID are described. The instruction sheet ID is issued by the instruction management server in storing the instruction sheet in the instruction management server performed by the instruction sheet creation apparatus 102, which is an identifier that can uniquely identify the instruction sheet.

The command 1102 and the command 1105 record steps related to the setup of the image forming apparatus 101 other than software. The command 1102 records the information necessary for installing the firmware. The command 1105 records the information necessary for importing a setting value of the image forming apparatus 101.

A command 1103 and a command 1104 indicate optional instructions related to the software. The command 1103 specifically indicates the software to be installed in the image forming apparatus 101. The software to be installed in the image forming apparatus 101 is the software specified on the instruction sheet creation screen 1000 (FIG. 10A). The instruction sheet execution program 700 of the image forming apparatus 101 transmits the information recorded in the command 1103 and the device serial number of the local apparatus to the license management server 104. The license management program 800 of the license management server 104 issues a license and transmits the license and the software file path to the image forming apparatus 101. The instruction sheet execution program 700 of the image forming apparatus 101 downloads a software file from the software management server 105 based on the received software file path, and installs the software together with the license that has been acquired in advance. The command 1104 records the information for starting the software installed by the command 1103 and making the software available to the user.

FIG. 12 is an example of the instruction sheet in the present embodiment. A summary 1201, the command 1102, and the command 1105 are described in an instruction sheet 1200. The instruction sheet 1200 does not have a description that corresponds to the command 1103 and the command 1104, which are optional instructions related to the software described in the conventional instruction sheet 1100.

An element 1202 is added to the summary 1201. The element 1202 reflects the result for inputting the control 1004 that specifies the software specifying method on the instruction sheet creation screen 1000 (FIG. 10B). If the user selects the software specifying method on the instruction sheet execution program side in accordance with the registered contents of the license management server 104 without inputting the product ID and the like, in other words, if the user selects the radio button 1006, "License Management Server" is recorded as a value. This means that the specifying of the software to be installed in the image forming apparatus 101 follows the registration state of the license management server 104. The instruction sheet when the radio button 1006 is selected is a general-purpose instruction sheet.

In contrast, if the user inputs the product ID and the license access number as in the conventional manner and selects the method for determining the software to be installed in accordance with the contents of the instruction sheet, in other words, the user selects the radio button 1005, "Script" is recorded in the element 1202 as a value. This means that the software to be installed in the image forming apparatus 101 is limited to the software specified in the instruction sheet. The instruction sheet at the time that the radio button 1005 is selected is not a general-purpose instruction but corresponds to a conventional instruction sheet (exclusive instruction sheet).

In the present embodiment, the element 1202 described in the summary 1201 serve as the instruction sheet type. If the value of "Script" indicating that the software to be installed is determined in accordance with the contents of the instruction sheet is described in the element 1202, the instruction sheet type is an exclusive instruction sheet (first type). If the value of "License Management Server" indicating that the software to be installed is determined based on the information registered in the license management server 104 is described in the element 1202, the instruction sheet type is a general-purpose instruction sheet (second type).

Figure 13:
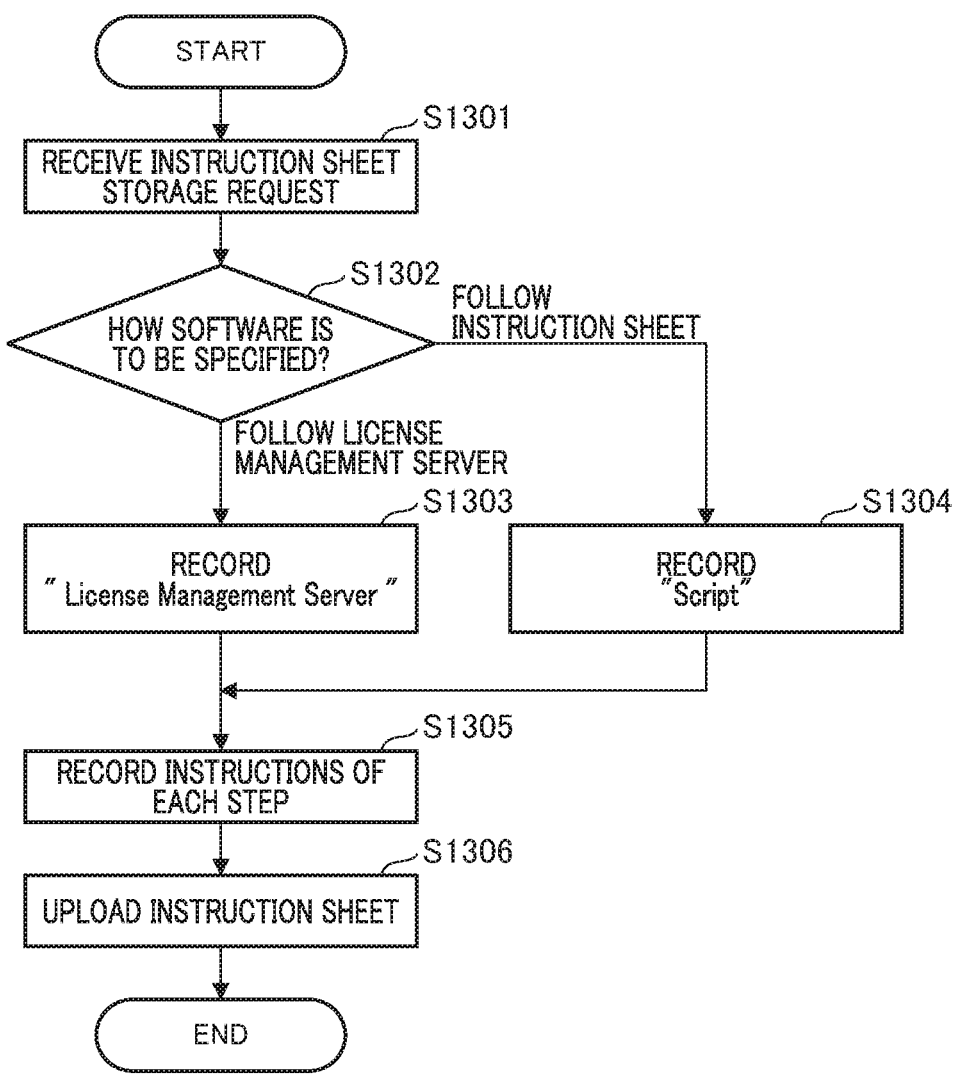
FIG. 13 is a flowchart illustrating the flow of the process of the instruction sheet creation program.

FIG. 13 is a flowchart illustrating the flow of process when the instruction sheet creation program 500 creates the instruction sheet 1200. In step S1301, the UI control unit 501 receives an instruction sheet storage request in response to an operation by the user (instruction sheet creator) and provides a notification about the received request to the processing execution unit 502. Note that it is assumed that the UI control unit 501 appropriately stores the setting contents in the instruction sheet creation screen 1000 in FIG. 10B in the RAM 303.

In step S1302, the processing execution unit 502 invokes the instruction sheet generation unit 503 to switch the processing in accordance with the software specifying method. The instruction sheet generation unit 503 reads and determines the software specifying method stored in the RAM 303. If the software specifying method is "follow the license management server" (if the radio button 1006 has been selected in FIG. 10B), the process proceeds to step S1303. In contrast, if the software specifying method is "follow the instruction sheet" (if the radio button 1005 has been selected in FIG. 10B), the process proceeds to step S1304.

In step S1303, the instruction sheet generation unit 503 records "License Management Server" as a value of the element 1202 of the instruction sheet 1200. Accordingly, the value indicating the second type is described as an instruction sheet type. In step S1304, the instruction sheet generation unit 503 records "Script" as a value of the element 1202 of the instruction sheet 1200. Accordingly, the value indicating the first type is described as an instruction sheet type.

In step S1305, the instruction sheet generation unit 503 records, in the instruction sheet, a command (for example, the command 1102 and the command 1105) indicating an instruction provided to each step necessary for the setup of the image forming apparatus 101 in accordance with various setting contents stored in the RAM 303. Upon completion of the generation of the instruction sheet, in step S1306, the processing execution unit 502 invokes the communication unit 504 and uploads the instruction sheet that has been generated by the instruction sheet generation unit 503 to the instruction sheet management server 103.

Figure 14:
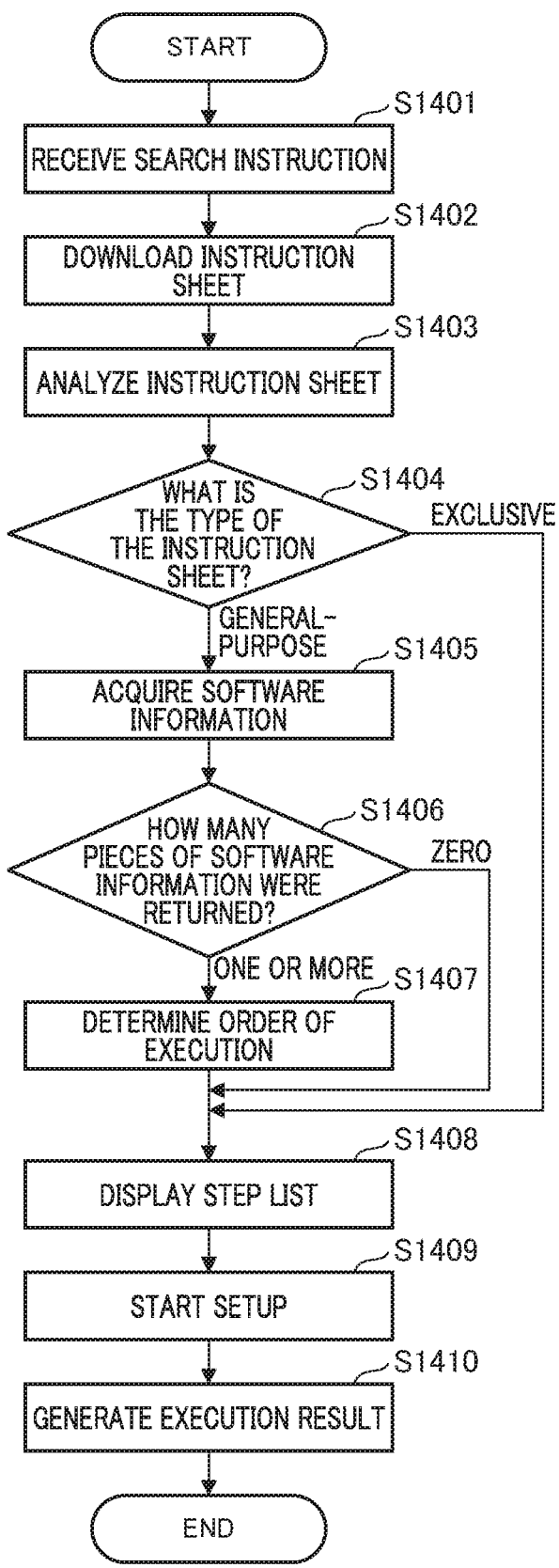
FIG. 14 is a flowchart illustrating the flow of the process of the instruction execution program.

FIG. 14 is a flowchart illustrating the flow of process when the instruction sheet execution program 700 executes the instruction sheet 1200. In step S1401, the UI control unit 701 receives an instruction to search an instruction sheet provided from the user (setup operator). The user inputs the instruction ID from the operation unit 208 of the image forming apparatus 101 to serve as a search instruction.

In step S1402, in response to the receipt of the search instruction by the UI control unit 701, the processing execution unit 702 transmits the instruction sheet download request together with the instruction sheet ID to the instruction sheet management server 103 via the communication unit 707. The instruction sheet management unit 602 of the instruction sheet management program 600 that has received the instruction sheet download request searches an instruction sheet in which the instruction sheet ID transmitted from the instruction sheet execution program 700 matches the instruction sheet ID recorded in the summary 1201 of the instruction sheet. Subsequently, the searched instruction sheet is transmitted to the image forming apparatus 101 via the communication unit 604. The communication unit 707 of the instruction sheet execution program 700 downloads the instruction sheet and stores it in the HDD 207.

In step S1403, the instruction sheet analysis unit 703 analyzes the instruction sheet stored in the HDD 207 and stores the information necessary for execution in the RAM 202. In step S1404, the instruction sheet analysis unit 703 reads the information stored in the RAM 202 and determines the type of the instruction sheet. The type of the instruction sheet is determined by the instruction sheet analysis unit 703 based on the value of the element 1202 indicating the software specifying method recorded in the summary 1201 of the instruction sheet 1200. If "License Management Server" is recorded in the element 1202, the instruction sheet analysis unit 703 determines that the type of the instruction sheet is the second type (general-purpose instruction sheet), and the process proceeds to step S1405. In contrast, if "Script" is recorded in the element 1202, the instruction sheet analysis unit 703 determines that the type of the instruction sheet is the first type (exclusive instruction sheet), and the process proceeds to step S1408.

In step S1405, the processing execution unit 702 transmits the device serial number of the local apparatus to the license management server 104 via the communication unit 707, and inquires about the information about software that can be installed on the local apparatus. The license management program 800 of the license management server 104 extracts the software ID of the software associated with the device serial number that has been received from the device information table (Table 5). Then, the license management program 800 extracts a software name and a software file path associated with the software ID from the software information table (Table 1). Further, the license management program 800 extracts the device serial number and a license path associated with the software ID from the license information table (Table 4). Then, the license management program 800 returns the software information to the image forming apparatus 101. In the present embodiment, the software information is information that includes the software ID, the software name, the software file path, and the license path of the software.

In step S1406, the processing execution unit 702 that has received the software information via the communication unit 707 determines whether or not at least one piece of the software information has been returned. If there is at least one piece of the software information, the process proceeds to step S1407. In contrast, if there is no software information, the process proceeds to step S1408.

In step S1407, the execution order determination unit 705 determines the order for executing the installation step and the startup step of the software based on the information stored in the RAM 202 and the acquired software information, and updates the information in the RAM 202. Specifically, at this stage, the contents of the RAM 202 are obtained by adding the installation step and the starting step of each of software in an appropriate order to the information stored by analyzing the instruction sheet 1200.

In step S1408, the processing execution unit 702 reads the information in the RAM 202, and through the UI control unit 701, displays a list of steps to be executed on the operation unit 208. For example, the contents shown in Table 6 are displayed as a step list. In the step list, the steps to be executed and the names of the contents to be used in each step are listed. Note that the example in Table 6 shows the contents of display when the instruction sheet execution program 700 executes the instruction sheet 1200 and the device serial number is DSN01. As shown in the device information table (Table 5), the software that can be installed in DSN01 is identified as SW_01.

TABLE 6

| Step | Contents Name |
| --- | --- |
| Update Firmware | Firmware_V100 |
| Install Software | SW_01 |
| Start Software | SW_01 |
| Import Setting Values | Configuration File |

In step S1409, the UI control unit 701 receives a setup start request in accordance with a user operation. The processing execution unit 702 invokes the command execution unit 704 in response to the setup start request. The command execution unit 704 sequentially executes commands in accordance with the information stored in the RAM 202. In the software installation step, the command execution unit 704 downloads a software file from the software management server 105 by using the software file path that has been acquired in step S1405. Subsequently, the command execution unit 704 downloads a license from the license management server 104 by using the license path that has been acquired in step S1405, and installs it.

In step S1410, the execution result generation unit 706 generates the execution result of each step and transmits the execution result to the instruction sheet management server 103. The execution result generation unit 706 generates a file that records the contents as shown, for example, in Table 7, to serve as the list of the execution result.

TABLE 7

| Step | Contents Name | Result |
| --- | --- | --- |
| Update of Firmware | Firmware_V100 | Successful |
| Installation of Software | SW_01(LMS) | Successful |
| Start of Software | SW_01(LMS) | Successful |
| Import of Setting Values | Configuration File | Failed |

In the list of execution results, in addition to the step to be executed and the names of the contents to be used in each step, the results for executing each step are recorded. Note that in the software installation step and the software start step, "LMS" is recorded in the content name, which indicates that the software has been specified in accordance with the registration information of the license management server 104.

As described above, the device information table (Table 5) is generated in the license management server 104 and the summary 1201 is recorded in the instruction sheet, thereby eliminating the necessity that the instruction sheet creator knows the device serial number and specifies the software. Furthermore, the setup operator can set up a plurality of image forming apparatuses having a plurality of configurations simply by inputting the instruction sheet ID of one general-purpose instruction sheet. For example, if the firmware to be updated and the setting value file to be imported are the same, an appropriate setup including software (or, in a configuration that does not include the software) is enabled by using only the instruction sheet 1200, which is a general-purpose instruction sheet for any image forming apparatus. As described above, by using the general-purpose instruction, it is possible to improve the efficiency of the operation for setting up the image forming apparatuses.

Second Embodiment

A software product may include a plurality of pieces of software. However, even if the software product is purchased, some customers may not need all the software included in the software product. For example, it is assumed that although the customer purchases a product P_02 in the product table (Table 2), the customer does not need a software SW_03 included in the product P_02. In the method described in the first embodiment, all the software included in the product P_02 is installed in the image forming apparatus 101. Accordingly, in the present embodiment, if a plurality of pieces of software is included in the software product, the setup operator can operate the operation unit 208 of the image forming apparatus 101 to select software to be installed.

Figure 15:
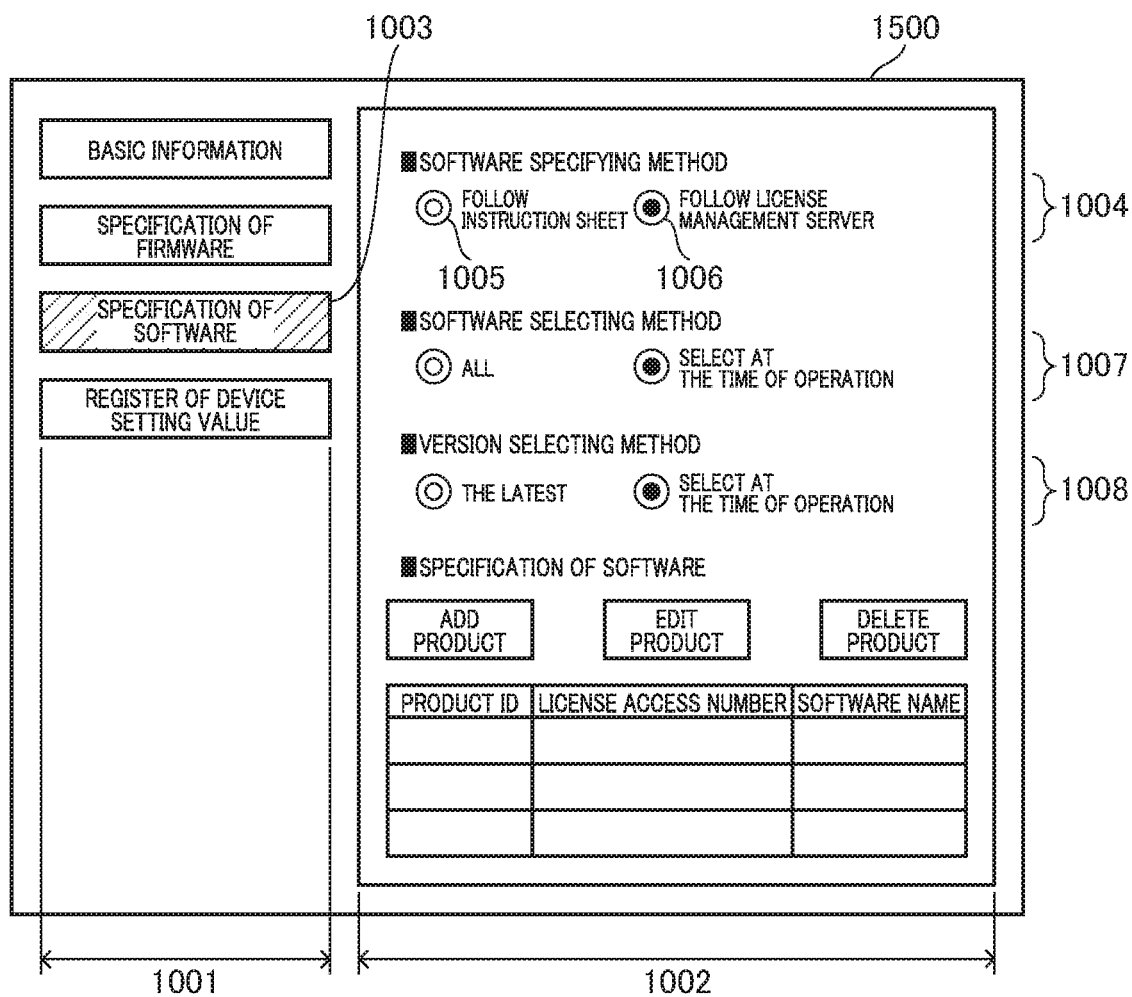
FIG. 15 illustrates an example of the instruction sheet creation screen according to the second embodiment.

FIG. 15 illustrates an example of the instruction sheet creation screen in the present embodiment. In an instruction sheet creation screen 1500 shown in FIG. 15, a control 1007 for specifying a software selection method and a control 1008 for specifying a software version selection method are added to the instruction sheet creation screen 1000 shown in FIG. 10B.

The control 1007 that specifies the software selection method is effective only when "Follow the license management server" is specified in the control 1004 for specifying the software specifying method. If "All" is specified in the control 1007, the instruction sheet generation unit 503 records in the instruction sheet that all software included in the product is to be installed. In contrast, if "Select at the time of operation" is specified in the control 1007, the instruction sheet generation unit 503 records in the instruction sheet that the setup operator will select the software to be installed from among the pieces of the software included in the product.

The control 1008 that specifies the method for selecting the software version is effective only when "Follow the license management server" is specified in the control 1004 for specifying the software specifying method. For example, although the product P_02 includes the software SW_02 and the software SW_03, these are not always different software. There may be case in which the software is the same but the versions thereof are different. In this way, in a manner similar to the case in which the product includes a plurality of pieces of software, it is necessary to also select the version as well.

If "The latest" is specified in the control 1008, the instruction sheet generation unit 503 records in the instruction sheet that the latest version of software is to be installed automatically even if the product includes a plurality of versions of the software. In contrast, if "Select at the time of operation" is specified, the instruction sheet generation unit 503 records in the instruction sheet that the setup operator will select the version of the software to be installed.

FIG. 16 illustrates the excerpt of a part of the instruction sheet that reflects the setting contents on the operation screen of FIG. 15. An instruction sheet 1600 includes a summary 1601, the command 1102, and the command 1105. An element 1602 is a part in which the setting contents of the control 1007 of the instruction sheet creation screen 1500 are reflected and the software specifying method is specified. An element 1603 is a part in which the setting contents of the control 1008 of the instruction sheet creation screen 1500 are reflected and the method for selecting the software version is specified.

If the value of the element 1108 or the element 1109 is "Choice", the flow of process when the instruction sheet execution program 700 executes the instruction sheet 1200 is substantially the same as that in the flowchart of FIG. 14, but step S1408 and step S1410 differ. If the value of the element 1108 and the element 1109 is "Choice", in step S1408, in which the instruction sheet execution program 700 displays the step list (Table 6), each step of "installation of software" is displayed in a selectable manner. For example, a check box may be provided in the left portion of the step, or a row of the step may be selected.

Additionally, in step S1410, in which the execution result is generated, the instruction sheet execution program 700 generates the execution result list shown in Table 8. In the present embodiment, "Not executed" can be denoted in addition to the result shown in the execution result list (Table 7) in the first embodiment. "Not executed" indicates that the setup operator has not selected the step.

TABLE 8

| Step | Content Name | Result |
| --- | --- | --- |
| Update of Firmware | Firmware_V100 | Successful |
| Installation of Software | SW_02(LMS) | Successful |
| Start of Software | SW_02(LMS) | Successful |
| Installation of Software | SW_03(LMS) | Not executed |
| Start of Software | SW_03(LMS) | Not executed |
| Import of Setting Values | Configuration File | Failed |

As described above, the device information table (Table 5) is generated in the license management server 104 and the summary 1201 is recorded in the instruction sheet, thereby eliminating the necessity that the instruction sheet creator knows the device serial number and specifies the software. Further, the setup operator can set up a plurality of image forming apparatuses having a plurality of configurations while selecting software to be installed simply by inputting the instruction sheet ID of one general-purpose instruction sheet.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as ('non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-237797, filed Dec. 19, 2018, which is hereby incorporated by reference wherein in its entirety.

What is claimed is:

1. A setup support system comprising:
    a plurality of image forming apparatuses;
    an information processing apparatus;
    an instruction management server that manages an instruction generated by the information processing apparatus; and
    a license management server that manages a license of software,
    wherein the information processing apparatus comprises:
        at least one processor and memory storing a program which makes the processor perform:
            generating the instruction having a first type or a second type,
    wherein the image forming apparatus comprises:
        at least one processor and memory storing a program that makes the processor perform:
            receiving an input of identification information of the instruction;
            receiving the instruction corresponding to the input identification information from the instruction management server;
            analyzing the generated instruction to determine whether the type of the instruction is the first type or the second type;
            transmitting a device serial number of the image forming apparatus to the license management server if the analyzed instruction is the second type;
            acquiring, from the license management server, information of the software to be installed in the image forming apparatus if the analyzed instruction is the second type, wherein the information of the software is identified using the device serial number;
            installing the software in the image forming apparatus based on the information of the software acquired from the license management server if the analyzed instruction is the second type; and
            installing the software in the image forming apparatus based on information of the software included in the analyzed instruction if the analyzed instruction is the first type without acquiring the information of the software from the license management server.

2. The setup support system according to claim 1, wherein, in the generation of the instruction, the first or second type of the generated instruction is specified by an operator of the information processing apparatus.

3. The setup support system according to claim 1, wherein the license management server comprises:
    at least one processor and memory storing a program that makes the processor perform:
        managing a device information table in which the device serial number that identifies the image forming apparatus and a software ID that identifies the software to be installed are linked;
        managing a software information table in which the software ID, a software name, and a software path are linked;
        managing a license information table in which the software ID, the device serial number, and a license path are linked; and
        transmitting, as the information of the software, the software ID corresponding to the device serial number received from the image forming apparatus, the software name, the software path, and the license path to the image forming apparatus if the analyzed instruction is the second type.

4. The setup support system according to claim 3, wherein if the license management server receives the device serial number of the image forming apparatus from the image forming apparatus:
    the processor of the license management server specifies a software ID linked to the device serial number;
    the processor of the license management server specifies a software name and a software path linked to the software ID;
    the processor of the license management server specifies a license path associated with the device serial number and the software ID; and
    the processor of the license management server transmits software information including the specified software ID, the specified software name, the specified software path, and the specified license path to the image forming apparatus.

5. The setup support system according to claim 1, wherein the processor of the image forming apparatus displays a list of a setup process for installing the software in the image forming apparatus.

6. The setup support system according to claim 1, wherein the processor of the image forming apparatus further displays a result of the installing of the software.

7. The setup support system according to claim 1, wherein the instruction having the second type further includes information that indicates whether or not a user who performs a setup is allowed to select a piece of software to be installed in the image forming apparatus if the software to be installed in the image forming apparatus includes a plurality of pieces of software.

8. An image forming apparatus comprising:
at least one processor and memory storing a program which makes the processor perform:
receiving an input of identification information of an instruction;
receiving the instruction corresponding to the input identification information from an instruction management server;
analyzing the instruction to determine whether a type of the instruction is a first type or a second type;
transmitting a device serial number of the image forming apparatus to a license management server that manages a license of software if the analyzed instruction is the second type;
acquiring, from the license management server, information of the software to be installed in the image forming apparatus if the analyzed instruction is the second type, wherein the information of the software is identified using the device serial number;
installing the software in the image forming apparatus based on the information of the software acquired from the license management server if the analyzed instruction is the second type; and
installing the software in the image forming apparatus based on information of the software included in the analyzed instruction if the analyzed instruction is the first type without acquiring the information of the software from the license management server.

9. A method for controlling a setup support system having a plurality of image forming apparatuses, an information processing apparatus, an instruction management server that manages an instruction generated by the information processing apparatus, and a license management server that manages a license of software, the method comprising:

generating, by the information processing apparatus, the instruction having a first type or a second type;
receiving, by the image forming apparatus, an input of identification information of the instruction;
receiving, by the image forming apparatus, the instruction corresponding to the input identification information from the instruction management server;
analyzing, by the image forming apparatus, the generated instruction to determine whether the type of the instruction is the first type or the second type;
transmitting, by the image forming apparatus, a device serial number of the image forming apparatus to the license management server if the analyzed instruction is the second type;
acquiring, by the image forming apparatus, from the license management server, information of the software to be installed in the image forming apparatus if the analyzed instruction is the second type, wherein the information of the software is identified using the device serial number;
installing, by the image forming apparatus, the software in the image forming apparatus based on the information of the software acquired from the license management server if the analyzed instruction is the second type; and
installing, by the image forming apparatus, the software in the image forming apparatus based on information of the software included in the analyzed instruction if the analyzed instruction is the first type without acquiring the information of the software from the license management server.

* * * * *